(12) United States Patent
Chen et al.

(10) Patent No.: US 10,715,286 B2
(45) Date of Patent: Jul. 14, 2020

(54) SEPARATE REPORTING OF RF AND BB CAPABILITIES OF A MOBILE USER EQUIPMENT IN A WIRELESS COMMUNICATIONS SYSTEM SUPPORTING CARRIER AGGREGATION

(71) Applicant: Telefonaktiebolaget LM Ericsson (publ), Stockholm (SE)

(72) Inventors: Maomao Chen, Lund (SE); Christian Bergljung, Lund (SE); Tao Cui, Upplands Väsby (SE); Shaohua Li, Beijing (CN); Ingrid Nordstrand, Sundbyberg (SE); Håkan Palm, Växjö (SE); Riikka Susitaival, Helsinki (FI); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

(21) Appl. No.: 15/746,087

(22) PCT Filed: Jul. 19, 2016

(86) PCT No.: PCT/EP2016/067174
§ 371 (c)(1),
(2) Date: Jan. 19, 2018

(87) PCT Pub. No.: WO2017/013113
PCT Pub. Date: Jan. 26, 2017

(65) Prior Publication Data
US 2018/0219652 A1    Aug. 2, 2018

Related U.S. Application Data

(60) Provisional application No. 62/195,398, filed on Jul. 22, 2015, provisional application No. 62/232,774, filed on Sep. 25, 2015.

(30) Foreign Application Priority Data

Oct. 5, 2015  (WO) ................ PCT/CN2015/091422

(51) Int. Cl.
*H04B 7/0413*  (2017.01)
*H04W 72/04*  (2009.01)
(Continued)

(52) U.S. Cl.
CPC ........... *H04L 5/001* (2013.01); *H04B 7/0413* (2013.01); *H04B 7/0626* (2013.01); *H04W 72/0406* (2013.01); *H04W 88/023* (2013.01)

(58) Field of Classification Search
CPC .... H04W 72/0453; H04W 76/15; H04L 5/14; H04L 5/16
See application file for complete search history.

(56) References Cited

U.S. PATENT DOCUMENTS 8,873,662 B2    10/2014 Sesia et al.
9,137,804 B2 *  9/2015 Lin ..................... H04W 72/048
(Continued)

FOREIGN PATENT DOCUMENTS

CN        102447662 A    5/2012
EP        2670202 A2    12/2013

OTHER PUBLICATIONS

Qualcomm Incorporated, "On the Limitations of Contiguous CA Capability Signaling," 3GPP-TSG RAN WG2 #88, R2-145163, Agenda Item 7.6.1, Nov. 17, 2014, San Francisco, CA, USA, pp. 1-4.
(Continued)

*Primary Examiner* — Raj Jain
(74) *Attorney, Agent, or Firm* — Coats & Bennett, PLLC

(57) ABSTRACT

An inventive UE carrier aggregation (CA) capability reporting signalling model allows UEs (30) aggregating large
(Continued)

numbers of component carriers to transmit CA-relevant capabilities to the network more efficiently than the current (legacy) signalling model. Rather than reporting CA/MIMO/CSI/NAICS capabilities separately for each supported band combination, including fallback configurations, embodiments of the present invention either report UE Radio Frequency (RF) and Baseband (BB) related capabilities separately, or report them disassociated from CA band configurations. This approach avoids the need to signal the full UE (30) set of capabilities for each of (possibly many) supported band combinations. Furthermore, fallback capabilities are signalled implicitly, eliminating the need to transmit this data.

17 Claims, 14 Drawing Sheets

(51) Int. Cl.
*H04W 88/02* (2009.01)
*H04L 5/00* (2006.01)
*H04B 7/06* (2006.01)

(56) References Cited

U.S. PATENT DOCUMENTS

| 2013/0051261 | A1 | 2/2013 | Kazmi et al. |
| 2013/0329665 | A1 | 12/2013 | Kadous et al. |
| 2014/0112298 | A1* | 4/2014 | Oh .................. H04L 5/0092 370/329 |
| 2014/0241446 | A1 | 8/2014 | Zhang et al. |
| 2015/0201326 | A1* | 7/2015 | Kazmi .................. H04W 28/18 370/329 |
| 2016/0192350 | A1* | 6/2016 | Yi .................. H04W 52/146 370/329 |
| 2016/0218853 | A1* | 7/2016 | Takeda .................. H04W 72/048 |
| 2018/0219652 | A1* | 8/2018 | Chen .................. H04L 5/001 |

OTHER PUBLICATIONS

Ericsson, "[89#21][LTE/CA] Capability Signalling for Continuous CA (Ericsson) Email Discussion Report," 3GPP-TSG RAN WG2 Meeting#89bis, R2151369, Bratislava, Slovakia, Apr. 20, 2015, pp. 1-5.

RAN WG2, "LS to RAN4 on capability signalling for B5C," 3GPP TSG RAN WG2 Meeting#90, R2152913, Fukuoka, Japan, May 25, 2015, pp. 1-3.

RAN WG4, "Reply LS on BW class, MIMO/CSI capabilities, measurement gaps, fallback and other issues for B5C," 3GPP TSG-RAN WG4 Meeting #76bis, R4-156706, Sophia Anti-Polis, France, Oct. 12, 2015, pp. 1-2.

Ericsson, "Capability Signalling Structure for NR," Agenda Item: 10.2.6—NR—Stage-2—UE capabilities, 3GPP TSG-RAN WG2 #98, Tdoc R2-1704430, Hangzhou, China, May 15, 2017, pp. 1-5.

Samsung, "Discussion on NR UE capability," 3GPP TSG-RAN WG4 RAN4 #83, R4-1704758, Hangzhou, China, May 15, 2017, pp. 1-3.

NTT Docomo, Inc., "Outcome of offline #32; MIMO capability reporting in BPC and BC," 3GPP TSG-RAN WG2 #99bis, R2-1712007, Oct. 9, 2017, Prague, Czech Republic, pp. 1-3.

Ericsson, "New Study Item: Study on LTE DL 4 Rx antenna ports", 3GPP TSG RAN Meeting #66, Dec. 8-11, 2014, pp. 1-7, Maui, Hawaii, US, RP-142299.

* cited by examiner

Table 5.6A-1: CA bandwidth classes and corresponding nominal guard bands

| CA Bandwidth Class | Aggregated Transmission Bandwidth Configuration | Number of contiguous CC | Nominal Guard Band $BW_{GB}$ |
|---|---|---|---|
| A | $N_{RB,agg} \leq 100$ | 1 | $a_1\ BW_{Channel(1)} - 0.5\Delta f_1$ (NOTE 2) |
| B | $25 < N_{RB,agg} \leq 100$ | 2 | $0.05\ max(BW_{Channel(1)}, BW_{Channel(2)}) - 0.5\Delta f_1$ |
| C | $100 < N_{RB,agg} \leq 200$ | 2 | $0.05\ max(BW_{Channel(1)}, BW_{Channel(2)}) - 0.5\Delta f_1$ |
| D | $200 < N_{RB,agg} \leq 300$ | 3 | $0.05\ max(BW_{Channel(1)}, BW_{Channel(2)}, BW_{Channel(3)}) - 0.5\Delta f_1$ |
| E | $300 < N_{RB,agg} \leq 400$ | 4 | NOTE 3 |
| F | $400 < N_{RB,agg} \leq 500$ | 5 | NOTE 3 |
| I | $700 < N_{RB,agg} \leq 800$ | 8 | NOTE 3 |

NOTE 1: $BW_{Channel(j)}$, $j = 1, 2, 3$, is the channel bandwidth of an E-UTRA component carrier according to Table 5.6-1 and $\Delta f_1 = \Delta f$ for the downlink with $\Delta f$ the subcarrier spacing while $\Delta f_1 = 0$ for the uplink.
NOTE 2: $a_1 = 0.16/1.4$ for $BW_{Channel(1)} = 1.4$ MHz whereas $a_1 = 0.05$ for all other channel bandwidths.
NOTE 3: Applicable for later releases.

Figure 1
(prior art)

Table 5.6A.1-1: E-UTRA CA configurations and bandwidth combination sets defined for intra-band contiguous CA

| E-UTRA CA configuration / Bandwidth combination set |||||||
|---|---|---|---|---|---|---|
| E-UTRA CA configuration | Uplink CA configurations (NOTE 3) | Component carriers in order of increasing carrier frequency ||| Maximum aggregated bandwidth [MHz] | Bandwidth combination set |
| | | Channel bandwidths for carrier [MHz] | Channel bandwidths for carrier [MHz] | Channel bandwidths for carrier [MHz] | | |
| CA_1C | CA_1C | 15 | 15 | | 40 | 0 |
| | | 20 | 20 | | | |

Figure 2
(prior art)

Table 5.6A.1-2: E-UTRA CA configurations and bandwidth combination sets defined for inter-band CA (two bands)

| E-UTRA CA configuration / Bandwidth combination set | | | | | | | | | | |
|---|---|---|---|---|---|---|---|---|---|---|
| E-UTRA CA Configuration | Uplink CA configurations (NOTE 4) | E-UTRA Bands | 1.4 MHz | 3 MHz | 5 MHz | 10 MHz | 15 MHz | 20 MHz | Maximum aggregated bandwidth [MHz] | Bandwidth combination set |
| CA_1A-3A | CA_1A-3A | 1 | | | Yes | Yes | Yes | Yes | 40 | 0 |
| | | 3 | | | Yes | Yes | Yes | Yes | | |

Figure 3
(prior art)

Table 5.6A.1-2a: E-UTRA CA configurations and bandwidth combination sets defined for inter-band CA (three bands)

| E-UTRA CA configuration / Bandwidth combination set | | | | | | | | | | |
|---|---|---|---|---|---|---|---|---|---|---|
| E-UTRA CA Configuration | Uplink CA configurations (NOTE 5) | E-UTRA Bands | 1.4 MHz | 3 MHz | 5 MHz | 10 MHz | 15 MHz | 20 MHz | Maximum aggregated bandwidth [MHz] | Bandwidth combination set |
| CA_1A-3A-5A | - | 1 | | | Yes | Yes | Yes | Yes | 50 | 0 |
| | | 3 | | | Yes | Yes | Yes | Yes | | |
| | | 5 | | | Yes | Yes | | | | |
| | | 1 | | | Yes | Yes | | | 40 | 1 |
| | | 3 | | | Yes | Yes | Yes | Yes | | |
| | | 5 | | | Yes | Yes | | | | |

Figure 4
(prior art)

Table 5.6A.1-3: E-UTRA CA configurations and bandwidth combination sets defined for non-contiguous intra-band CA (with two sub-blocks)

| E-UTRA CA configuration / Bandwidth combination set | | | | | | |
|---|---|---|---|---|---|---|
| E-UTRA CA configuration | Uplink CA configurations (NOTE 1) | Component carriers in order of increasing carrier frequency | | | Maximum aggregated bandwidth [MHz] | Bandwidth combination set |
| | | Channel bandwidths for carrier [MHz] | Channel bandwidths for carrier [MHz] | Channel bandwidths for carrier [MHz] | | |
| CA_2A-2A | - | 5, 10, 15, 20 | 5, 10, 15, 20 | | 40 | 0 |
| CA_41A-41C | - | 5, 10, 15, 20 | See CA_41C Bandwidth Combination Set 1 in Table 5.6A.1-1 | | 60 | 0 |

Figure 5
(prior art)

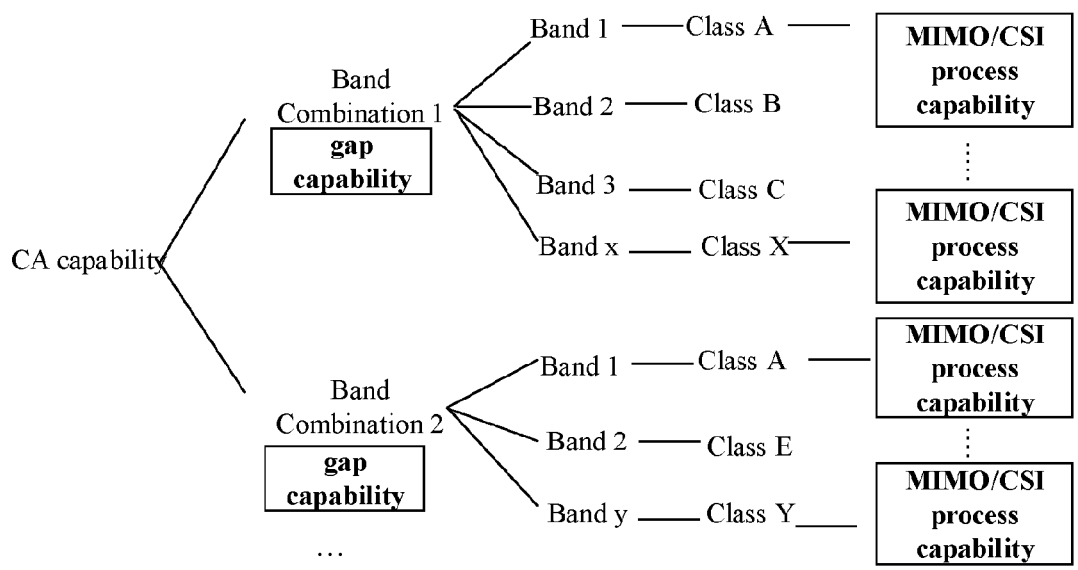

Figure 6
(prior art)

| supported FreqBand | Class A (1 CC) | Class B (2 CC) | Class C (2 CC) | Class D (3 CC) | Class E (4 CC) | Class F (5 CC) | Class I (8 CC) |
|---|---|---|---|---|---|---|---|
| X | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL |
| Y | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL |
| Z | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL | maxMIMOLayersForDL<br><br>maxMIMOLayersForUL |

Figure 7

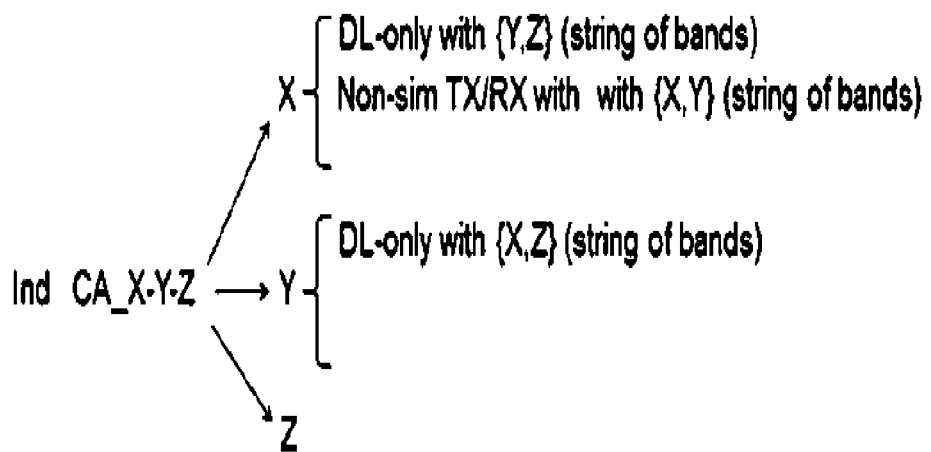

Figure 8

| CA_Band | E-UTRA Band | 1.4 MHz | 3 MHz | 5 MHz | 10 MHz | 15 MHz | 20 MHz |
|---|---|---|---|---|---|---|---|
| CA_X-Y-Z | X | | Yes | Yes | Yes | Yes | Yes |
| | | Bandwidth Combination set index "i" for supported intra-band contiguous CA) ||||||
| | | Bandwidth Combination set index "i" for supported intra-band non-contiguous CA) ||||||
| | Y | | Yes | Yes | Yes | Yes | Yes |
| | | Bandwidth Combination set index "i" for supported intra-band contiguous CA) ||||||
| | | Bandwidth Combination set index "i" for supported intra-band non-contiguous CA) ||||||
| | Z | | Yes | Yes | Yes | Yes | Yes |
| | | Bandwidth Combination set index "i" for supported intra-band contiguous CA) ||||||
| | | Bandwidth Combination set index "i" for supported intra-band non-contiguous CA) ||||||

Figure 9

| MIMO layers configured per carrier | Supported CSI process on the carrier |
|---|---|
| 1 layer | Nr of CSI process supported |
| 2 layers | Nr of CSI process supported |
| 4 layers | Nr of CSI process supported |
| 8 layers | Nr of CSI process supported |

Figure 10

$$\begin{aligned}
&BasebandProcessingPowerPerUE \\
&= \alpha \times ProcessingPowerPerMIMOLayer \\
&\quad \times TotalNrOfMIMOLayers + \beta \times ProcessingPowerPerCSIProc \\
&\quad \times TotalNrOfCSIProc + \gamma \\
&\quad \times ProcessingPowerForNAICSPerPRB \\
&\quad \times TotalNrOfPRBsForNAICS + \delta \\
&\quad \times ProcessingPowerForCAPerPRB \times TotalNrOfPRBsForCA
\end{aligned}$$

Figure 11

| Configuration | 20 MHz | 40 MHz | 60 MHz | 80 MHz | 100 MHz |
| --- | --- | --- | --- | --- | --- |
| 2x2 MIMO | x | 2x | 3x | 4x | 5x |
| 4x2 MIMO | 2x | 3x | 4x | 5x | 6x |
| 2x4 MIMO | 3x | 5x | 8x | 11x | 14x |
| 4x4 MIMO | 4x | 8x | 12x | 15x | 19x |

Figure 12

| Configuration | 20MHz | 40MHz | 60MHz | 80MHz | 100MHz |
| --- | --- | --- | --- | --- | --- |
| One CSI process | 0.1 x | 0.2 x | 0.3 x | 0.4 x | 0.5 x |
| Two CSI processes | 0.2 x | 0.4 x | 0.6x | 0.8 x | 1x |
| Four CSI processes | 0.4x | 0.8x | 1.2x | 1.6x | 2.0x |
| Eight CSI processes | 0.8x | 1.6x | 2.4x | 3.2x | 4.0x |

Figure 13

```
-- ASN1START

UE-EUTRA-Capability ::=    SEQUENCE {
    accessStratumRelease       AccessStratumRelease,
    ue-Category                INTEGER (1..5),
    pdcp-Parameters            PDCP-Parameters,
    phyLayerParameters         PhyLayerParameters,
    rf-Parameters              RF-Parameters,
    measParameters             MeasParameters,
    featureGroupIndicators     BIT STRING (SIZE (32))           OPTIONAL,
    interRAT-Parameters        SEQUENCE {
        utraFDD                    IRAT-ParametersUTRA-FDD          OPTIONAL,
        utraTDD128                 IRAT-ParametersUTRA-TDD128       OPTIONAL,
        utraTDD384                 IRAT-ParametersUTRA-TDD384       OPTIONAL,
        utraTDD768                 IRAT-ParametersUTRA-TDD768       OPTIONAL,
        geran                      IRAT-ParametersGERAN             OPTIONAL,
        cdma2000-HRPD              IRAT-ParametersCDMA2000-HRPD     OPTIONAL,
        cdma2000-1xRTT             IRAT-ParametersCDMA2000-1xRTT    OPTIONAL
    },
    nonCriticalExtension       UE-EUTRA-Capability-v920-IEs     OPTIONAL
}

UE-EUTRA-Capability-v1270-IEs ::= SEQUENCE {
    rf-Parameters-v1270        RF-Parameters-v1270
    nonCriticalExtension       UE-EUTRA-Capability-v13xy-IEs    OPTIONAL
}

UE-EUTRA-Capability-v13xy-IEs ::= SEQUENCE {
    rf-Parameters-v13xy        RF-Parameters-v13xy              OPTIONAL
    nonCriticalExtension       SEQUENCE {}                      OPTIONAL
}
```

Figure 21A

```
RF-Parameters-v13xy ::=  SEQUENCE {
    32CarrierSupport-r13        ENUMERATED {supported}   OPTIONAL,
    supportedBandCombinationUpTo32Carrier-r13  SupportedBandCombinationUpTo32Carrier-r13  OPTIONAL,
    supportedMIMO-FreqBandList-r13    SupportedMIMO-FreqBandList-r13 OPTIONAL,
    supportedCSI-MIMO-r13      SupportedCSI-MIMO-r13   OPTIONAL
}

SupportedMIMO-FreqBandList-r13 ::= SEQUENCE (SIZE (1..maxBands)) OF SupportedMIMO-CapabilityPerFreqBand-r13

SupportedMIMO-CapabilityPerFreqBand-r13 ::= SEQUENCE (SIZE (1..maxBandwidthClass-r13)) OF SupportedMIMO-CapabilityPerClass-r13

SupportedMIMO-CapabilityPerClass-r13 ::= SEQUENCE {
    SupportedMaxMIMO-LayersDL-r13   INTEGER (1..256)   OPTIONAL,
    SupportedMaxMIMO-LayersUL-r13   INTEGER (1..128)   OPTIONAL
}
```

Figure 21B

```
SupportedCSI-MIMO-r13    ::= SEQUENCE {
    csiForOneLayer          SupportedCSI-Proc-r13,
    csiForTwoLayer          SupportedCSI-Proc-r13,
    csiForFourLayer         SupportedCSI-Proc-r13,
    csiForEightLayer        SupportedCSI-Proc-r13,
    ...
}

SupportedCSI-Proc-r13    ::= ENUMERATED {n1, n3, n4}

CA-BandwidthClass-r13    ::= ENUMERATED {a, b, c, d, e, f, I, Q}
```

Figure 21C

```
--Alternative solution for baseband capability

RF-Parameters-v13xy ::=        SEQUENCE {
    32CarrierSupport-r13               ENUMERATED {supported}              OPTIONAL,
    supportedBandCombinationUpTo32Carrier-r13  SupportedBandCombinationUpTo32Carrier-r13
                                                                           OPTIONAL,
    supportedMIMO-FreqBandList-r13             SupportedMIMO-FreqBandList-r13     OPTIONAL,
    supportedBasebandCapability-r13            SupportedBasebandCapability-r13    OPTIONAL
}

SupportedBasebandCapability-r13 ::= SEQUENCE {
    basebandProcessingPowerPerUE-r13           INTEGER ()
    basebandProcessingPowerperMIMO-Layer-r13   INTEGER ()
    basebandProcessingPowerPerCSI-Proc-r13     INTEGER ()              OPTIONAL,
    basebandProcessingPowerForNAICS-PerPRB-r13 INTEGER ()              OPTIONAL,
    basebandProcessingPowerForCA-PerPRB-r13    INTEGER ()              OPTIONAL,
    processingFactorSet-R13         SEQUENCE {
        alpha       ProcessingFactor-r13                               OPTIONAL,
        beta        ProcessingFactor-r13                               OPTIONAL,
        gamma       ProcessingFactor-r13                               OPTIONAL,
        delta       ProcessingFactor-r13                               OPTIONAL,
        ...
    }                                                                  OPTIONAL,
    ...
}

ProcessingFactor-r13 ::= ENUMERATED {p05, p10, p15, p20, p25, p30, p40,
                         p50, p60, p70, p75, p80, p85, p90, p95, p100}

-- ASN1STOP
```

Figure 21D

SEPARATE REPORTING OF RF AND BB CAPABILITIES OF A MOBILE USER EQUIPMENT IN A WIRELESS COMMUNICATIONS SYSTEM SUPPORTING CARRIER AGGREGATION

TECHNICAL FIELD

The present invention relates generally to wireless telephony, and in particular to an efficient system and method of transmitting carrier aggregation capabilities for User Equipment.

BACKGROUND

Carrier Aggregation (CA) is a technique to increase bandwidth, and hence bitrate, of the air interface between a wireless communication network and a subscriber's User Equipment (UE). In CA, two or more component carriers (CC) are modulated with data, and the UE receives (or transmits) data from (or onto) all specified CCs. This both increases peak user data rates and overall network capacity, and allows operators to exploit fragmented spectrum allocations.

Release 10 of the 3GPP Long Term Evolution (LTE) standard introduced a limited form of CA, called Dual Cell (DC), which allowed the aggregation of two intra-band contiguous CCs (FDD or TDD) or two inter-band non-contiguous CCs (FDD only). CA was expanded in Rel. 11 to allow aggregation of two intra-band non-contiguous CCs (FDD or TDD). Rel. 12 expanded the number of CCs that may be aggregated, introduced CA in the uplink, and provided a framework for aggregation between FDD and TDD carriers. Rel. 13 further expanded the number and types of aggregated CCs, and allows aggregation between licensed and unlicensed spectrum. As of Rel. 13, aggregation of up to eight contiguous CCs is defined. Each CC may have a bandwidth of 1.4, 3, 5, 10, 15, or 20 MHz. Hence, the maximum defined bandwidth is 8×20 MHz=160 MHz.

To effectively configure each UE for CA, the network must be aware of the UE's capabilities. UEs communicate these capabilities to the network when in the RCC connected state; the network transfers this information to a target serving node during handover. The serving node need not maintain each UE's CA capabilities in RCC idle state. To avoid re-transmitting this information upon every transition to connected state, the serving node may upload the CA capability information to a Mobility Management Entity (MME), and retrieve when a specific context for the UE is created, as the UE transitions to RRC connected state.

The CA capability uplink signaling defined through Rel. 13 (referred to herein as legacy signaling) is centered on the aggregated bands. For each supported band combination, the UE reports its capability with respect to RF features, such as the supported frequency bands and band combinations, carrier bandwidths, whether it supports multiple TimingAdvance or simultaneous Tx/Rx, number of MIMO antennas, and the like. Additionally, for each band the UE reports baseband (BB) capabilities, such as the number of MIMO layers it can process, the number of Channel State Information (CSI) processes supported, Network Assisted Interference Cancellation (NAIC) capability in CA, and the like. Since this information is separately reported for each supported band combination, as CA capabilities expand and UEs are capable of supporting many combinations of CCs, the data reported to the network becomes voluminous, and much of it is repeated. Furthermore, legacy signaling requires the UE to report separately its fallback capabilities—that is, if one or more CCs becomes unavailable, which lower-order CA the UE supports (and all of its capabilities for each fallback combination). Future 3GPP Releases are expected to support up to 32 aggregated carriers (in uplink as well as downlink). For large numbers of aggregated carriers, legacy CA signaling will impose too great a burden on system overhead. Indeed, transmission of CA capability per UE will likely exceed the current PDCP PDU size limit, for transmission over the air interface, of 8080 bytes.

As used herein, the non-limiting term radio network node or simply network node refers to any type of node of a wireless communication network that is serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), and the like.

As used herein, the non-limiting term user equipment (UE) refers to any type of wireless device communicating with a radio network node in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, and the like.

Embodiments of the present invention are described herein with respect to the 3GPP EUTRA/LTE system. The embodiments are however applicable to any RAT or multi-RAT system where the UE operates with UL feedbacks consisting of channel status estimated from UE side e.g. UTRA/HSPA, GSM/GERAN, Wi Fi, WLAN, WiMax, CDMA2000, and the like.

As used herein, the term carrier aggregation (CA) is synonymous with the terms "multi-carrier system", "multi-cell operation", "multi-carrier operation", "multi-carrier" transmission and/or reception.

Embodiments of the present invention are applicable to a UE capable of at least one receive antenna and also apply to UE with two or more receive antennas. The embodiments are also applicable in conjunction with MIMO in which the UE is able to receive and/or transmit data to more than one serving cells using MIMO, e.g., 2, 4 or 8 receiver antennas at the UE.

Each UE is served by at least one serving cell (also known as a first serving cell or simply a primary serving cell), which in turn is managed or served by a first network node. The UE may also be served by plurality of serving cells, e.g., a first serving cell such as a Primary Cell (PCell), a second serving cell such as a first Secondary Cell (SCell), a third serving cell such as a second SCell, and so on in CA. In dual connectivity a first serving cell may be PCell and a second serving cell may be a PSCell and third and additional serving cells may be SCells. Different serving cells may be managed or served by the same first network node or by different network nodes, e.g., PCell by the first network node and SCell(s) by a second network node and so on.

The UE reception of signals from the serving cell may also be interfered by signals from one or more interfering cells, also known as inter-cell interference. For example, UE reception from the first serving cell may be interfered by a first interfering cell.

As used herein, the term time resource refers to a temporal division or duration defined by the applicable standard. Examples of time resource include time slot, transmission time interval (TTI), subframe, symbol, frame, scheduling period, data and/or control channel reception time or instant, and the like. Typically, the UE can be scheduled during each time resource (e.g., subframe) and therefore the UE generally monitors one or more control channels during each time resource for determining whether the UE is scheduled or not.

The UE is scheduled with the data in downlink (i.e., receives data) on one or more data channels but at least a first data channel (e.g., PDSCH) from at least the first cell. Therefore data reception corresponds to DL PDSCH demodulation in LTE system.

In some embodiments, data structures such as lists or information elements are described using particular notations. These notations are only provided as examples; those of skill in the art will recognize that other notation may be used.

SUMMARY

Legacy CA signalling requires a UE to signal its CA/MIMO/CSI/NAICS capabilities separately for each supported band combination, including fallback configurations. According to embodiments disclosed and claimed herein, CA signalling is defined that either reports UE Radio Frequency (RF) and Baseband (BB) related capabilities separately, or reports them disassociated from CA band configurations. This is possible since the RF configurations and the baseband processing capacity in a UE are fixed once the UE is delivered. This approach avoids the need to signal the full UE set of capabilities for each of (possibly many) supported band combinations. Furthermore, fallback capabilities are signalled implicitly, eliminating the need to transmit this data.

One embodiment relates to a method of communicating carrier aggregation, CA, capabilities from User Equipment, UE, to a node in a wireless communication network. CA capabilities relating to the UE radio frequency, RF, operation and CA capabilities relating to the UE baseband, BB, operation are separately transmitted to the network node. The RF capabilities comprise the number of supported frequency bands and number of MIMO layers supported. The BB capabilities comprise an indication of the aggregated bandwidth supported and an indication of the Channel State Information, CSI, process complexity supported.

Another embodiment relates to a method, by a node in a wireless communication network, of obtaining carrier aggregation, CA, capabilities from User Equipment, UE. Separately transmitted CA capabilities relating to the UE radio frequency, RF, operation and CA capabilities relating to the UE baseband, BB, operation are received. The RF capabilities comprise the number of supported frequency bands and number of MIMO layers supported. The BB capabilities comprise an indication of the aggregated bandwidth supported and an indication of the Channel State Information, CSI, process complexity supported. The received CA capabilities relating to RF or BB operation of a UE are utilized to configure or execute one or more radio operational or radio resource management tasks.

BRIEF DESCRIPTION OF THE DRAWINGS

FIG. 1 is Table 5.6A-1 of 3GPP TS 36.101, v13.1.0 (prior art).

FIG. 2 is Table 5.6A.1-1 of 3GPP TS 36.101, v13.1.0 (prior art).

FIG. 3 is Table 5.6A.1-2 of 3GPP TS 36.101, v13.1.0 (prior art).

FIG. 4 is Table 5.6A.1-2a of 3GPP TS 36.101, v13.1.0 (prior art).

FIG. 5 is Table 5.6A.1-3 of 3GPP TS 36.101, v13.1.0 (prior art).

FIG. 6 is a graph depicting the hierarchical structure of legacy CA capability signaling (prior art).

FIG. 7 is a table depicting one structure for reporting the maximum number of MIMO layers for DL and UL per bandwidthclass.

FIG. 8 is a partial view of a SupportedInterbandCombinations data structure for reporting inter-band combinations of supported bands.

FIG. 9 is an entry in a SupportedIntrabandCombinations data structure for reporting intra-band combinations of supported bands.

FIG. 10 is a representative data structure for reporting the relationship between MIMO layers and CSI processes that a UE can support based on total BB processing capability.

FIG. 11 is a parameterized equation of BB processing power per UE.

FIG. 12 is a table of processing complexity of various MIMO and bandwidth combinations relative to a basic configuration.

FIG. 13 is a table of processing complexity of various CSI process and bandwidth combinations relative to a basic configuration.

FIGS. 21A-D are segments of Rel. 12 signaling code demonstrating one implementation of the signaling of FIGS. 10 and 11.

DETAILED DESCRIPTION

Legacy Signaling

Figure 14:
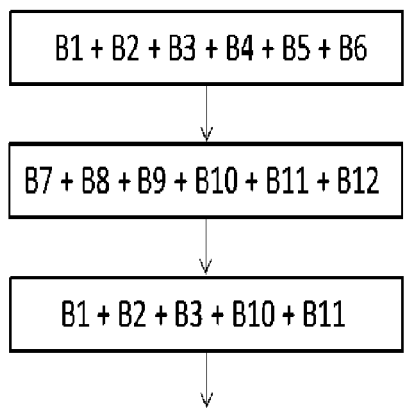
FIG. 14 is a view of various supported combinations of frequency bands.

FIG. 1 is a table reproduced from 3GPP Technical Specification (TS) 36.101, v13.1.0, Table 5.6A-1. This table depicts the six different CA class definitions (A-I).

The CA configuration and bandwidth combination set are also defined in TS 36.101 with different CA capability. For example, FIG. 2 is a reproduction of Table 5.6A.1-1, showing intra-band contiguous CA configurations, with the supported bandwidth combinations for each CC in order of increasing carrier frequency. The UL CA capability is also indicated in a separate column in the table. FIG. 3 depicts Table 5.6A.1-2, showing another CA capability as inter-band CA between two frequency bands.

In order to provide more flexibility of deployment of different bandwidths within the same frequency band, the bandwidth combination set is also introduced in the tables in the last column. FIG. 4 depicts Table 5.6A.1-2a, showing CA configuration for inter-band aggregation with three bands involved. As depicted in the last column, different bandwidth combination sets can be supported under same CA configuration. In the example of FIG. 4, Set 0 is the superset of the maximum aggregated bandwidth that can be supported with such CA configuration, while Set 1 is a subset of Set 0, with smaller maximum aggregated bandwidth, which the UE also supports.

Furthermore, the CA configuration of intra-band non-contiguous CA can be indicated with two sub-blocks, where a sub-block is defined as a collection of contiguous CCs within a band. For example, FIG. 5 depicts Table 5.6A.1-3, showing that as long as each sub-block is configured either as single CC or contiguous CA, they can be viewed as intra-band non-contiguous CA.

Another notion used is CA band, which denotes two or more bands in which carriers are aggregated, e.g. CA_X-Y that denotes aggregation of carriers in Band X and Band Y of any CA bandwidth class.

According to the UE capability Information Element (IE) from 3GPP TS 36.331, the legacy signaling indication of CA support has the following hierarchical structure:

RF structure
Supported_band_insequence
Supported_bandcombination_insequence
Supported_bandcombinationset_insequence
   multipleTimingAdvance
   simultaneousRx-Tx
   bandInfoEUTRA
   dc-Support
   supportedNAICS-2CRS-AP
   commSupportedBandsPerBC
   BandParameters
      Band parameter_DL
         CABandClass DL
         CA-MIMO-ParametersDL
      Bandparameter_UL
         CABandClass DL
         CA-MIMO-ParametersUL
   CSIprocess

CA MIMO Capability and CSI Process Per Band

FIG. 6 also depicts the structure of legacy CA capability signaling. This figure is reproduced from R2-152913, 3GPP TSG RAN WG2 Meeting #90, Fukuoka, Japan, 25-30 May 2015 (LS to RAN4 on capability signaling for B5C). As FIG. 6 shows, CA capability, such as MIMO/CSI process capability (and additionally NAICS CA capability), is separately reported, either per bandwidthClass/band or per bandCombination.

There are numerous reasons for the excessive size of legacy CA capability signaling, particularly as UEs support more than five CC. These include:

- Increasing of the number of supported frequency bands and band combinations among these bands.
- Explicit signaling of fallback configurations as each band combination implies other capabilities that may not be the same between superset and subset CA combinations.
- Multiple band entries are signaled for intra band non-contiguous and inter band CA combinations.
- Ca-BandwidthClass is split into DL and UL, and each supported bandwidthClass is signaled explicitly.
- supportedMIMO-Capability is split into DL and UL. Additionally, it is indicated per bandwidthClass.
- interFreqNeedForGaps and interRAT-NeedForGaps are signaled per UE's supported band for each band combination.
- supportedCSI-Proc indicated per band entry for each band combination and further per CC in case of contiguously aggregated carriers as agreed recently.
- Bandwidth combination set is signaled per band combination and takes up to 32 bits (values) most of which are not used by RAN4
- One CA band combination can be signaled more than once.

Per band combination, the UE reports BandwidthClass of each band in the band combination and corresponding MIMO/CSI capability. The band width classes include seven type of BandwidthClass for which the maximum bandwidth could be up to 800 RBs and the number of CCs could be up to eight.

NAIC Capability

3GPP TS 36.331, v12.5.0 defines Network Assisted Interference Cancellation (NAIC) CA capability as band agnostic signaling to indicate the number of CCs and the maximum aggregated bandwidth to be supported by the UE, by a step size of 25 PRBs as an naics-Capability-List. This list indicates that the UE supports NAICS, i.e., receiving assistance information from the serving cell and using it to cancel or suppress interference of neighboring cell(s) for at least one band combination. If not present, UE does not support NAICS for any band combination. The field numberOfNAICS-CapableCC indicates the maximum number of component carriers where the NAICS processing is supported and the field numberOfAggregatedPRB indicates the maximum aggregated bandwidth across these component carriers (expressed as a number of PRBs).

For numberOfNAICS-CapableCC=1, UE signals one value for numberOfAggregatedPRB from the range {50, 75, 100};

For numberOfNAICS-CapableCC=2, UE signals one value for numberOfAggregatedPRB from the range {50, 75, 100, 125, 150, 175, 200};

For numberOfNAICS-CapableCC=3, UE signals one value for numberOfAggregatedPRB from the range {50, 75, 100, 125, 150, 175, 200, 225, 250, 275, 300};

For numberOfNAICS-CapableCC=4, UE signals one value for numberOfAggregatedPRB from the range {50, 100, 150, 200, 250, 300, 350, 400};

For numberOfNAICS-CapableCC=5, UE signals one value for numberOfAggregatedPRB from the range {50, 100, 150, 200, 250, 300, 350, 400, 450, 500}.

Fallback

Fallback is defined as release of a secondary cell (carrier) for a CA configuration. Under the existing concept of CA when multi-carriers can be supported by UE it is mandated for any CA configuration that subsets of the supported CA configuration with maximum supported CA should be supported by UE as well, called the fallback capability of CA. In particular, the UE must support the CA configuration that results from release of a Secondary Cell. This means for more than eight CCs it is necessary to design a CA capability signaling with backward compatibility to also indicate the legacy CA capability (less than or equal to eight carriers) for both band specific and band agnostic signaling.

Inventive Signaling Hierarchy

In various embodiments of the present invention, CA capability signaling may take the following hierarchical structure, with alternatives listed for reporting supported bandwidth. Note that, as discussed more fully herein, the structure breaks cleanly between RF structure and BB capabilities.

RF structure
Supported_band_insequence
  IntraBandParameters
    Number of sub-blocks supported
    Support of contiguous and non-contiguous intra-band CA:
      number of CCs per sub-block e.g. in order of increasing frequency
      Alt1: SupportedBandwidthPerCC: bitmaps for supported bandwidth per CC within each sub-block
      Alt2: BandwidthCombinationSetPerSubblock: bitmaps of supported bandwidth combination set per sub-block
      Alt3: BandwidthCombinationSet: bitmaps or bandwidth combination set index for supported intra-band contiguous and non-contiguous CA configurations across sub-blocks per band
  MIMO_RFcapability
Supported_interbandcombination_insequence
Supported_interbandcombinationset_insequence
  String of frequency band numbers that can be combined for DL: set of Nk bands that can be combined (can be >5), fallback operation to any fewer bands number must be supported
  multipleTimingAdvance
  simultaneousRx-Tx
  dc-Support
  supported NAICS-2CRS-AP
BB_capability
MIMO_BBcapability
CSI_process
NAICS
Other capabilities related to the Base band complexity, such as CRS-IC, control channel IC capabilities According to embodiments of the present invention, BB related CA capabilities, such as MIMO/CSI/NAIC process capacity, are reported separately from RF capability, such as supported frequency bands, sub-groups, bandwidth classes, and the like. This avoid duplication of reporting the same information for every possible supported band combination, and allows for the same information to be transmitted from UEs to the network in a much smaller payload than would be required if legacy CA capability signaling were extended to the aggregation of greater than eight CCs.

RF Capability Signaling

MIMO Layer Signaling

The MIMO capability from the RF side depends on different CA bands and the number of supported antennas in the bands, frequency especially but not on the bandwidth combination. For the RF capability signaling, several options are provided:

In one embodiment, information on the supported number of MIMO layers is indicated for each supported band.

In one embodiment, information on the supported number of MIMO layers is indicated for each supported band combination.

In one embodiment, information on the supported number of MIMO layers is indicated for each supported band combination set.

In one embodiment, information on the supported number of MIMO layers is indicated per bandwidthclass for each supported band. An example of this embodiment is depicted in FIG. 7. For bandwidthClass implying more than one carrier, it means the total MIMO capability for these contiguous carriers on the band. Then it is up to the network to configure the number of layers for each carrier, while respecting this total MIMO capability.

In each embodiment, the information on the supported number of MIMO layers may be the maximum supported number of MIMO layers or the minimum supported number of MIMO layers. The MIMO capability is separately signalled for DL and UL. The MIMO capability provided by a UE may be limited to only a list of frequency bands requested by the network.

These embodiments can be combined. For example, for some bands, the information on the supported number of MIMO layers may be indicated per band; while for other bands, the information on the supported number of MIMO layers may be indicated per band combination.

Indication of the Supported Inter-Band Combinations

The supported combinations of operating bands (CA_band) are indicated by a list of SupportedInterbandCombinations. These can be indexed in 3GPP TS 36.101. Each entry has the structure depicted in FIG. 8. "Ind" denotes the index in the table of supported CA_bands (i.e. inter-band combinations). For each CA_band, the properties related to inter-band combinations are listed for each band. Primary cell (PCell) support can be indicated by listing the bands for which the band entry (e.g., X) is limited to downlink only. This may be related to pairs of bands: if Y is included, then X is DL-only (and will not support PCell operation) if combined with band Y. The same applies for other entries in the string of bands. If both Y and Z are indicated, this also means that X can only be DL-only in the combination CA_X-Y-Z.

Similarly, the SupportedInterbandCombinations list may indicate in which band pair a given band (e.g., X) can only support non-simultaneous Tx/Rx. This only applies to TDD bands.

All of the fallback modes CA_X-Y, CA_Y-Z, and CA_X-Z are implicitly indicated.

Indication of the Supported Intra-Band Combinations

In a list of SupportedIntrabandCombinations, the following RF-related entries can be indicated for each band (e.g., X):
  Number of sub-blocks supported;
  BW-class in the sub-blocks supported (string of BW-classes that can be supported in any permutation);
  Supported bandwidth combination sets (probably needed for both contiguous and non-contiguous CA).

Bandwidth Combination Sets

The bandwidth combination sets would not be indicated for the inter-band combination CA_X-Y-Z, but instead by each band entry in the SupportedIntrabandCombinations. This can be the existing sets supported for intra-band contiguous CA and intra-band non-contiguous CA. FIG. 9 depicts a representative entry. For each band, three rows contain the reference to (1) non-CA within the band, (2)

intra-band contiguous CA, and (3) intra-band non-contiguous CA. The latter may be optional if there is no need to indicate an "exception."

The bandwidth sets for intra-band contiguous CA could then contain a bitmap for each bandwidth class supported: for example, if D is the maximum, bitmaps for the B and C also supported by the band may be included. The bandwidth set could possibly be the existing (e.g., for CA_42C and CA_42D).

For intra-band non-contiguous aggregations, the bandwidth sets may be listed in accordance with the maximum number of sub-blocks supported: if three sub-blocks is the maximum supported for a band, one bitmap is included for two sub-blocks and another bitmap for three sub-blocks. Alternatively, the "maximum set" may be indicated for the maximum number of sub-blocks supported.

BB Capability Signaling

According to embodiments of the present invention, UE baseband processing capability is signaled per UE, rather than per band or band combination. Information about total UE BB processing capability is also signaled, allowing the network to configure BB processes for the UE without violating its capacity. In one embodiment, BB related CA capability is signaled by reporting the aggregate capability for MIMO/CSI processes. In another embodiment, the relative complexity of each configuration to a basic configuration is reported. In either case, the network may configure the UE to any desired configuration within the UE's indicated capability.

Aggregate BB Capability Reporting

In this embodiment, at least one of the following is reported to the network:

Maximum supported number of CC

Aggregated bandwidth (full bandwidth for each CC) supporting M layers

Aggregated bandwidth (full bandwidth for each CC) supporting N layers

Aggregated bandwidth (full bandwidth for each CC) supporting K layers

Aggregated bandwidth (full bandwidth for each CC) supporting X CSI process

Aggregated bandwidth (full bandwidth for each CC) supporting Y CSI process

Aggregated bandwidth (full bandwidth for each CC) supporting Z CSI process

In one embodiment, the relationship between supported MIMO layers and CSI processes may be signaled explicitly. For example, FIG. 10 illustrates one way in which a UE may signal to the network not only its total capacity for MIMO and CSI processes, but how those capabilities are related (as they must share baseband processing resources).

FIG. 11 depicts an alternative definition of total UE baseband processing capability. In one embodiment, the basebandProcessingPowerPerUE and the processingPowerPer MIMOLayer/Per CSI/Per NAICS/Per CA are signalled to the network by UE. The network then decides the number of aggregated carriers/MIMO layers/CSI process/PRBs for NAICS according to this indicated total baseband processing power in the UE.

There may be dependencies between different functionalities from a baseband processing point of view. In this case a set of extra factors ($\alpha$, $\beta$, $\gamma$, $\delta$) for each functionality can be added and also signalled in the UE capability. Each of the factors may have a value range (0,1]: (p05=0.05, p10=0.10, p15=0.15, p20=0.2, . . . , p95=0.95, p100=1). The definition of UE total baseband processing capability (FIG. 11) is extensible to include any new baseband capabilities introduced later.

FIGS. 21A-D depict a UE-EUTRA-Capability information demonstrating one example of UE CA BB capability signaling of the information depicted in FIGS. 10 and 11, based on Rel-12 signaling. FIG. 21A relates to overall UE-ETRA capability. FIG. 21B relates to RF parameters, and conveys supported band combinations and MIMO layer capabilities related to the bands. FIG. 21C depicts the information of FIG. 10—CSI process support as a function of the number of MIMO layers. FIG. 21D depicts the information of FIG. 11—an alternate method of transmitting baseband capability by sending the various parameters that comprise the equation of FIG. 11. Those of skill in the art will recognize that FIGS. 21A-D are representative and exemplary only, and that the information described above may be signaled in a variety of ways.

Relative BB Capability Reporting

In another embodiment, a basic configuration is defined, and the UE reports its BB processing capability relative to the basic configuration. The basic configuration may be predefined, or may be dynamically signaled between the UE and the network. The UE reports to the network either its relative complexity for each configuration to the basic configuration, or the aggregated relative complexity.

For example, assume 2×2 MIMO and 20 MHz is the basic configuration. For other configurations, the UE reports its relative complexity to the basic configuration. One example is shown in FIG. 12, where the basic configuration of 2×2 MIMO and 20 MHz has a complexity "x." When the aggregated bandwidth is 100 MHz and the UE operates in 4×4 MIMO, the total complexity is 19x. The UE can report all these relative complexities for each configuration.

Based on the aggregated relative complexity for each UE, and the relative complexity for each configuration, the network can flexibly configure CA for the UE. For example, if the maximum supported number of function blocks is 5x, the network can configure the UE to support 100 MHz and 2×2 MIMO, or configure UE to support 40 MHz and 2×4 MIMO.

In one embodiment, the relative complexity is parameterized. For example, the relative complexity depicted in FIG. 12 may be parameterized as:

Complexity$_{MIMO}$=f$_1$ ($\alpha$, number of MIMO layers, bandwidth, transmit antennas, transmission mode, receiver type).

In one embodiment, the function f$_1$(.) is $$f_1 = \alpha * \text{NumberofMIMOLayers} * \text{NumberofPRBs} * \text{NumberofTransmitAntennas}$$

In this equation, a may be different for different configurations.

Similarly, other BB capabilities—such as CSI process configuration, NAIC configuration, CRS interference cancellation—can be reported as relative to a basic configuration. FIG. 13 depicts a table of relative complexity for CSI process configuration, wherein the basic configuration is two CSI processes and 100 MHz aggregated bandwidth.

The relative complexity for CSI processes can also be parameterized. For example, the relative complexity depicted in FIG. 13 may be parameterized as:

Complexity$_{CSI\text{-}Process}$=f$_2$ (β, number of CSI RS ports, bandwidth).

In one embodiment, the function f$_2$(.) is $$f_2=1*NumberofCSIRSPorts*BW$$

In this equation, β may be different for different configurations.

For NAIC or CRS-IM, the NAIC or CRS-IM complexity can be tabulated or parameterized similarly to the MIMO layer, as discussed above. In one embodiment, the parameterization is given by:

Complexity$_{NAIC\text{-}Process}$=f$_3$(γ,number of aggressor cells,bandwidth,number of aggressor cell CRS ports).

In one embodiment, the function f$_3$(.) is $$f_3=\gamma*NumberofAggressorCells*BW*NumberofAggressorCellIsCRSports$$

In this equation, γ may be different for different configurations.

Measurement Gap Capability

In legacy signalling, the UE indicates whether it requires measurement gaps for inter-frequency or inter-RAT measurements for each supported EUTRAN and inter-RAT band per band combination. In one embodiment, this gap capability signalling is reduced by only reporting the requests for measurement gaps for the list of frequency bands that are requested by the network as part of the network requested band combination procedure.

Further, for inter-RAT capabilities the network may include a list of requested bands of other RATs (UTRAN, GERAN, CDMA2000, etc.) in the UE Capability Enquiry. When this list is received, the UE reports the supported bands for other RATs and the corresponding capabilities, including the measurement gap capability that are limited within the requested bands. If this list is not included in the UE Capability Enquiry, the UE should not report any inter-RAT capabilities at all.

Combined Reporting Disassociated from Band Combinations

In one embodiment, the UE RF and BB capabilities are not reported separately, but rather are reported in an efficient manner utilizing a list of bands combined with bitmaps indicating the support within each band. In this embodiment, a UE transmits the following information to the network (the Cn numbering is for reference only):

C1: A list of combinations of frequency bands, in which each entry indicates support of N$_k$ bands out of M bands supported by the UE (with k the index in the list of frequency band combinations). The fallback to less than N$_k$ out of these N$_k$ bands is implicitly indicated;

C2: For each entry of N$_k$ bands, the capabilities related to combinations of different frequency bands are indicated. Bitmaps are used to map the capability between the N$_k$ bands (and the fallback modes), e.g., simultaneous TX/RX, multiple timing advance, Dual Connectivity support, and the like;

C3: A list of the band-specific capabilities, including the number of supported sub-blocks, supported intra-band contiguous and non-contiguous aggregation information, e.g., maximum CA BW class, number of CCs, MIMO capability, CSI process, etc., per sub-block. Each band-specific capability is listed with same order corresponding to each band entry in the list of supported bands. The capability within a band also applies if the said band is combined with another band; and C4: The "maximum" capability across all bands and carriers, e.g., the total number of aggregated carriers.

Each supported set of N$_k$ bands is indicated in a string of entries of N$_k$ band numbers. Each entry of N$_k$ bands signifies a supported CA Band and contains the capability specific to the combination of the N$_k$ bands. These capabilities can be, e.g., simultaneous Tx/Rx (for combinations of FDD and TDD) and support of multiple timing advances between bands.

The supported combinations of operating bands (up to N$_k$ bands) are indicated in such a way that a set of N$_k$ bands is indicated among the M bands supported by the UE and such that all possible fallback modes are supported. Each set of N$_k$ bands is unique, and the fallback modes to less than N$_k$ bands are implicitly indicated. If not all fallback modes are supported among the N$_k$ bands, then the N$_k$ bands may be listed in several entries in the list of supported band combinations, such that all fallbacks are supported for each entry.

Since all fallback modes are indicated implicitly in each entry of N$_k$ bands, indication of the support of functionality between these N$_k$ bands must be included in case the particular inter-band capability is not supported across all the N$_k$ bands. Simultaneous Tx/Rx may not be supported across all N$_k$ bands in cases some of the combined bands support TDD, for example. A bitmap or a similar arrangement may be used for this purpose. In one embodiment, the bitmap indication is based on pairs of bands, in which each bit indicates that the capability is supported across the band pair (Bx, By), where Bx and By denote Band x and Band y, respectively. This means that the length of the bitmap is N(N−1)/2 for each combination of N$_k$ bands. If (Bx, By), (Bx, Bz) and (By, Bz) are indicated, this means that the capability is supported across the three bands (Bx, By, Bz), if the UE can supported the particular capability across three bands. One example: if multiple timing advance (TA) is supported in the pairs of bands (Bx, By), (Bx, Bz) and (By, Bz), then it is supported across (Bx, By, Bz) if the UE has the capability of managing multiple TA across three bands (number of TA groups supported).

In another embodiment, a bit pattern indicates bands that could be used simultaneously. In this embodiment, the bitmap size would be 2^N−1>>N(N−1)/2. In this case a bit string of N containing only "1" means that the capability is supported across all bands of the combination. The pairwise indication may be made using a shorter bitmap.

In one embodiment, the bitmap for the simultaneous Tx/Rx is devised based on the fact that the simultaneous Tx/Rx capability is between a pair of bands: the UE radio front end then allows reception in one band while there is UL transmission in another band. Hence if a maximum of N bands can be combined, it can be indicated by N*(N−1)/2 entries, or using the alternative indication described above.

The bitmap size can vary depending on the number of bands that can be combined. The bits may be ordered in an unambiguous way by using the sequence using ascending orders, e.g., (B1, B2), (B1, B3) . . . (BN−1, BN) so the network must know what each bit means for different numbers of supported bands.

In one embodiment a bitmap for multiple timing advances (MTA) is devised in a similar way: this then describes the pair of bands across which multiple TA management can be used. The MTA capability between carriers within a band is indicated in the band-specific element. In practice, the UL capability is not likely to exceed five bands in the near future; hence operators may rely on the legacy signaling.

The bitmaps for dual connectivity (DC) describe the combination of bands that can accommodate different Cell Groups (CG) for asynchronous operation. The CG capability between carriers within a band is indicated in the band-specific element (can also be MCG and SCG within a band).

In one embodiment, the first two elements of CA capability signaled to the network (e.g., C1 and C2) are specified in a SupportedInterBandCombination list, where the string of band list is for indicating the operating bands that can be combined, with the fallbacks implicitly indicated. The functionality (e.g., simultaneous Tx/Rx) is managed by using bitmaps. The capability within each band combined is indicated by a single entry per band.

```
SupportedInterBandCombination
{
    String of frequency band numbers that can be combined for DL: set
    of N_k bands that can be combined, fallback operation to any
    fewer bands number must be supported
    String of frequency band numbers that can be combined for UL: set
    of N_k bands that can be combined, fallback to any
    fewer number must be supported
    Simultaneous Tx/Rx: Bitmap or similar
    MultipleTimingAdvance: Bitmap or similar
```

-continued

```
    DC support: bitmap [follow the standard but note that the bit map
    becomes very large for N > 4], describes in which pair of bands
    different CGs can be accommodated.
    BandwidthCombinationSet: bitmap
}
```

All the supported band combinations are contained in a list of SupportedInterBandCombination. FIG. 14 shows an example of list of SupportedInterBandCombination indicated by a UE supporting M=12 frequency bands B1-B12. This example UE is supporting combinations of up to 6 bands out of the 12, but not all combinations of 6 bands are supported, as limited by the UE radio front-end. Support of the combination B1+ . . . +B6 (the CA band CA_1-2-3-4-5-6) means that a fallback mode such as, e.g., B1+B2+B3+B4 is also supported. The implicit signaling of fallback significantly reduces the capability information that needs be sent to the network. This reduction is needed in order to support capability indication for up to 32 CCs.

Contrary to legacy signaling, the capability related to each supported combination of operating frequency bands is indicated separately from the capability within an operating band. Hence, the intra-band capability need not be repeated for each inter-band combination supported, which reduces the quantity of information transmitted. The capability parameters listed per band or frequency band combination are only provided as examples to show that the solution is feasible.

For each band the band-specific capability (C3) is described in a list with the same order as the string of frequency bands supported by the UE—one capability element for each band. The band-specific information covers both contiguous and non-contiguous CA. Hence, each band-specific element also contains information on, e.g., different CG for Dual Connectivity across sub-blocks.

An example of a capability element for a specific band is listed below (with alternative embodiments noted):

```
SupportedCACapabilityPerBand
{
    Number of sub-blocks supported
    Support of contiguous and non-contiguous intra-band CA:
    {
        maximum UL BW class per sub-block e.g. in order of increasing frequency
        maximum DL BW class per sub-block e.g. in order of increasing frequency
        number of CCs per sub-block e.g. in order of increasing frequency
        Alt1: SupportedBandwidthPerCC: bitmaps for supported bandwidth per CC
    within each sub-block
        Alt2: BandwidthCombinationSetPerSubblock: bitmaps of supported bandwidth
    combination set per sub-block
        UL and DL MIMO capability across CCs in each sub-block or each CC if the
    capability is not the same per sub-block
        CSI Processes across CCs in each sub-block
    }
    Alt3: BandwidthCombinationSet: bitmaps or bandwidth combination set index for
    supported intra-band contiguous and non-contiguous CA configurations across sub-
    blocks per band
    MultipleTimingAdvance: between CCs within the band
    DC support: the mapping of carriers to different CG within the band
}
```

The UL and DL MIMO capability indicates the number of layers supported across the carriers or sub-blocks and also if the maximum number of layers are not supported for all carriers. The MIMO capability may be mapped to each sub-block. This can also include indication of the MIMO capability of each CC within a sub-block. If intra-band CA is not supported in the band, the number of sub-blocks is one and containing only a single CC (Bandwidth Class A).

The DC support within a band may be indicated as in legacy signaling.

In different embodiments, the supported bandwidth, or bandwidth combinations, or bandwidth combination sets may be indicated differently.

In one embodiment, listed as Alternative 1 in Example 1, a bitmap or similar is used to indicate the supported bandwidth per CC explicitly, so that the supported bandwidth from one CC can be combined with other supported bandwidth from other CC, without indicating or predefining any type of combination sets.

In another embodiment, listed as Alternative 2 in Example 1, supported bandwidth combination set per sub-block is used, if such supported bandwidth combination sets are predefined. A bitmap of supported bandwidth combination set per sub-block can be used or the set index directly to be used in the CA signaling.

An example for another embodiment, listed as Alternative 3 in Example 1, is the same SupportedInterBandCombination discussed above, and depicted in FIG. 9 for the inter-band combination BX+BY+BZ, i.e., the CA band CA_X-Y-Z. The capability for this combination would be indicated in an entry SupportedInterBandCombination in the list of supported band combinations. The bitmap for the supported BandwidthCombinationSet indicates support of set "0". This set also contains an index of sets indicated in Supported-CACapabilityPerBand for each band in case a combination of intra-band and inter-band CA is configured by the network (bandwidth combination sets for intra-band contiguous and non-contiguous CA configurations are already defined in legacy signaling). For example: if six CCs are configured across bands X, Y, and Z with two contiguous CCs in each band, the supported bandwidth combinations are given by the index for contiguous CA in each band. The UE can also indicate several bandwidth combinations sets for CA_X-Y-Z (in SupportedInterBandCombination) in case not all inter- and intra-band combinations are supported by all UEs.

Hence the bandwidth combination sets are given for each CA band (e.g., CA_X-Y-Z) including the band-specific sets. This relies on the fact that the UE has a certain capability for each band, and that these bands can be combined.

For the embodiments listed as Alternative 2 and Alternative 3 in Example 1, the bandwidth combination sets supported for each CA configuration have slightly different definitions compared to the legacy one. For Alternative 2, the combination set per sub-block is only the set as intra-band contiguous CA with supported bandwidth combinations among the contiguous CCs. For Alternative 3, the combination set per band is the set among different sub-blocks. Compared to legacy signaling, the indications of the bandwidth capabilities for inter-band and intra-band combinations are decoupled.

In yet another embodiment, similar to the legacy CA bandwidth combination set, each inter-band combination supported contains a bitmap in the corresponding entry SupportedInterBandCombination indicating the supported bandwidth combination sets. Then this information is combined with the bandwidth combination set indicated in the band-specific entry SupportedCACapabilityPerBand for each band of the inter-band combination, in order to yield the bandwidth combinations that can be configured by the network.

Examples of the C4 information transmitted to the network include: MaximumNumberofCC (across all aggregated bands) MaximumNumberofMTAGroups (across all aggregated carriers) MaximumNumberofSubBlocks (across all the aggregated bands supporting non-contiguous CA)

The information transmitted in C1-C3 may be complemented with information of the total capability of the UE (C4) in case there are, e.g., processing limitations linked to the UE category. The required signaling may also be reduced if these restrictions need not be accounted for in each band combination indicated. For example, a UE may not support multiple timing advance management across all aggregated carriers.

Network Action

In all of the embodiments described herein, a network node (typically, but not necessarily the primary serving node, such as eNB), receives (directly or indirectly) the CA capability information from a UE, and configures CA parameters for the UE to achieve the desired or required bandwidth, while respecting the UE's limitations and capabilities. In particular, the network node may use the received information to perform one or more radio operational or radio resource management tasks, such as:

Cell Configuration: Depending on the supported bands and CA capability of the UE, the network may decide which frequency bands, in licensed or unlicensed spectrum, to allocate for CA use to the UE. Additionally, the network node may decide which cells to use for PCell for CA or DC operations.

Coordination Between Cells: Depending on the load condition from all supported bands, the network may coordinate between cells, e.g., to offload the licensed bands, to achieve better throughput.

Transmitting Information to Other Nodes: The receiving network node may also signal the received CA capability information to another network node. For example, the receiving network node may send it to a second network node (such as eNB to RNC over Iub interface in HSPA) and/or to a third network node (such as to a neighboring base station over X interface in LTE), etc. The receiving network node may use the received information for one or more radio tasks. For example, the RNC may adapt or modify one or more UEs with the correlation information provided by the UEs. As mentioned above, a Mobility Management Entity (MME) may store a UE's CA capability information when it goes from RRC connected state to idle state, and no longer has an active context with the eNB.

Signaling Coordination

To utilize the new CA capability signaling described herein, both the UE and the network must signal that each understands and supports the new signaling. To reduce signaling, the network may indicate the frequency bands for which it supports CA to the UEs according to prior art signaling (e.g., System Information broadcasts).

In one embodiment, the network may indicate in the UE Capability Enquiry whether or not it supports the inventive CA capability signaling. Since the inventive signaling includes implicit signaling of the fallback modes, UEs supporting this signaling could significantly reduce overhead traffic, as compared to legacy signaling. The band combinations corresponding to fallback modes do not have to be indicated by the legacy fields in the UE capability information element. As an example, if a UE supports a combination of N specific bands, and the same N bands are supported (and requested) by the network, then only one operating band combination with these N bands needs to be sent. This could also cover cases with less than N bands among bands that are supported as the fallback capability.

Whether the network supports the inventive signaling structure can be indicated in RRC signaling transmitted from the network to each UE through RRC configuration signaling for each serving network node. In one embodiment, only a single bit is required to indicate such capability.

Methods

Figure 15:
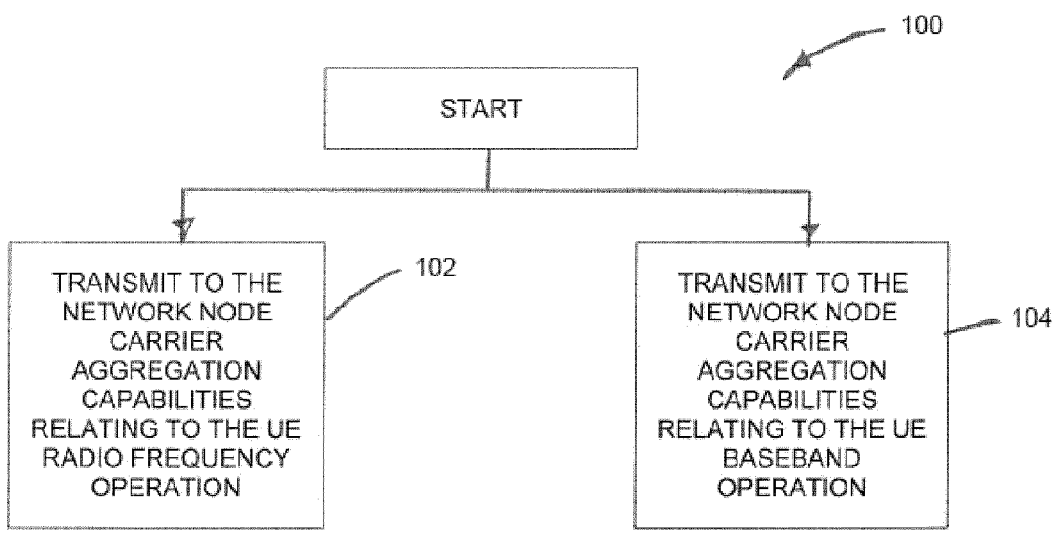
FIG. 15 is a flow diagram of a method of separately transmitting CA RF and BB capability information from a UE to the network.

FIG. 15 depicts a method 100 of communicating CA capabilities from a UE to a node in a wireless communication network. The method comprises separately transmitting to the network node CA capabilities relating to the UE RF operation (block 102) and CA capabilities relating to the UE BB operation (block 104). These transmissions are depicted as proceeding in parallel to indicate their independent nature, not that they are necessarily transmitted simultaneously. Indeed, those of skill in the art will appreciate that the RF capability reporting (block 102) and the BB capability reporting (block 104) may occur simultaneously or sequentially, and in either order. The RF capabilities comprise at least the number of supported frequency bands and number of MIMO layers supported by the UE. The BB capabilities comprise at least an indication of the aggregated bandwidth supported and an indication of the CSI process complexity supported by the UE.

Figure 16:
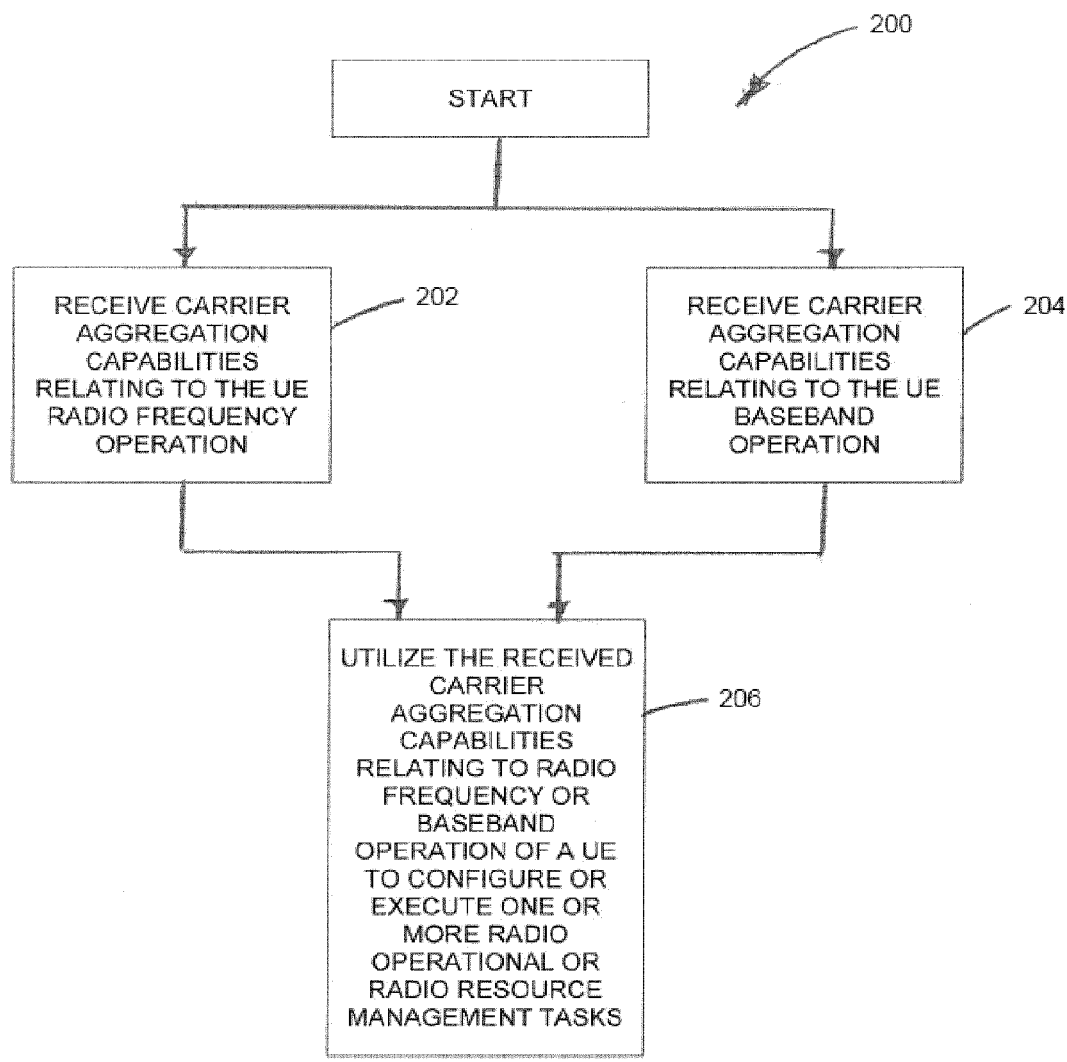
FIG. 16 is a flow diagram of a method of receiving separately transmitted CA RF and BB capability information from a UE.

FIG. 16 depicts a method 200, performed by a node in a wireless communication network, of obtaining CA capabilities from a UE. The network node receives separately transmitted CA capabilities relating to the UE RF operation (block 202) and CA capabilities relating to the UE BB operation (block 204). These receptions are depicted as proceeding in parallel to indicate their independent nature, not that they are necessarily transmitted or received simultaneously. Indeed, those of skill in the art will appreciate that the RF capability receiving (block 102) and the BB capability receiving (block 104) may occur simultaneously or sequentially, and in either order. The RF capabilities comprise at least the number of supported frequency bands and number of MIMO layers supported by the UE. The BB capabilities comprise at least an indication of the aggregated bandwidth supported and an indication of the CSI process complexity supported by the UE. The network node then utilizes the received CA capabilities relating to RF or BB operation of a UE to configure or execute one or more radio operational or radio resource management tasks (block 206)—such as configuring CA cells, coordinating cells, transmitting the UE CA capability information to other network nodes, or the like.

Hardware

Figure 17:
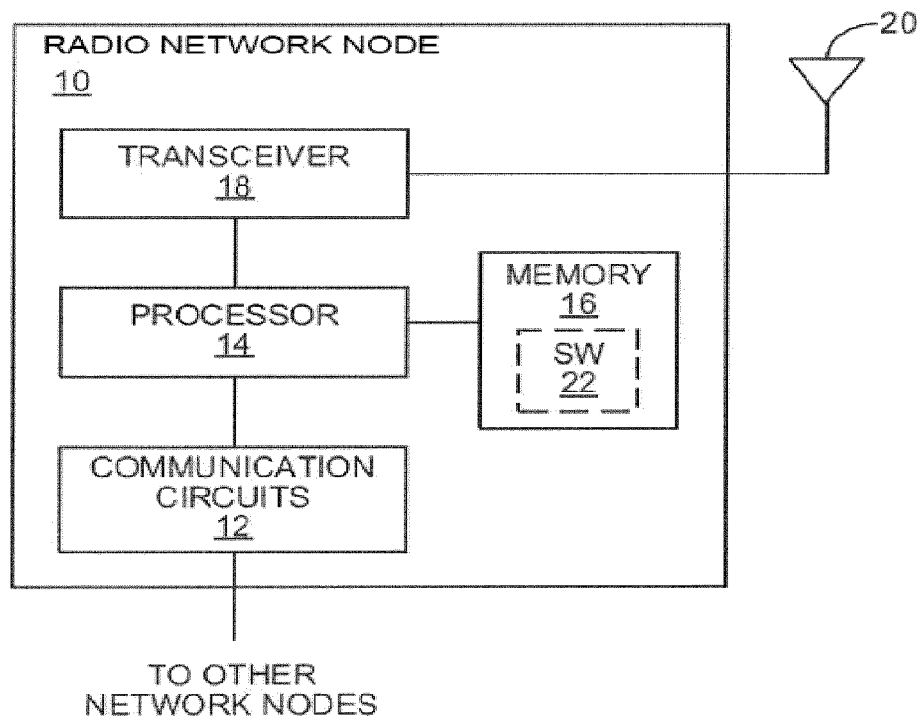
FIG. 17 is a block diagram of a wireless communication network node.

FIG. 17 depicts a radio network node 10 operative in a wireless communication network, such as LTE. The radio network node 10 includes communication circuits 12 operative to exchange data with other network nodes; processing circuitry 14; memory 16; and radio circuits, such as a transceiver 18, one or more antennas 20, and the like, to effect wireless communication across an air interface to one or more UEs. The antenna(s) may be physically located separately from the radio network node 10, such as mounted on a tower, building, or the like. Although the memory 16 is depicted as being separate from the processing circuitry 14, those of skill in the art understand that the processing circuitry 14 includes internal memory, such as a cache memory or register files. Those of skill in the art additionally understand that virtualization techniques allow some functions nominally executed by the processing circuitry 14 to actually be executed by other hardware, perhaps remotely located (e.g., in the so-called "cloud").

According to embodiments of the present invention, the memory 16 is operative to store, and the processing circuitry 14 is operative to execute, software 22 which when executed is operative to cause the radio network node 10 to receive separately transmitted CA capabilities relating to the UE RF operation and CA capabilities relating to the UE BB operation, and/or RF/BB capabilities decoupled from supported CA band combinations, as described and claimed herein. In particular, the software 22, when executed on the processing circuitry 14, is operative to perform the method 200 described and claimed herein.

Figure 18:
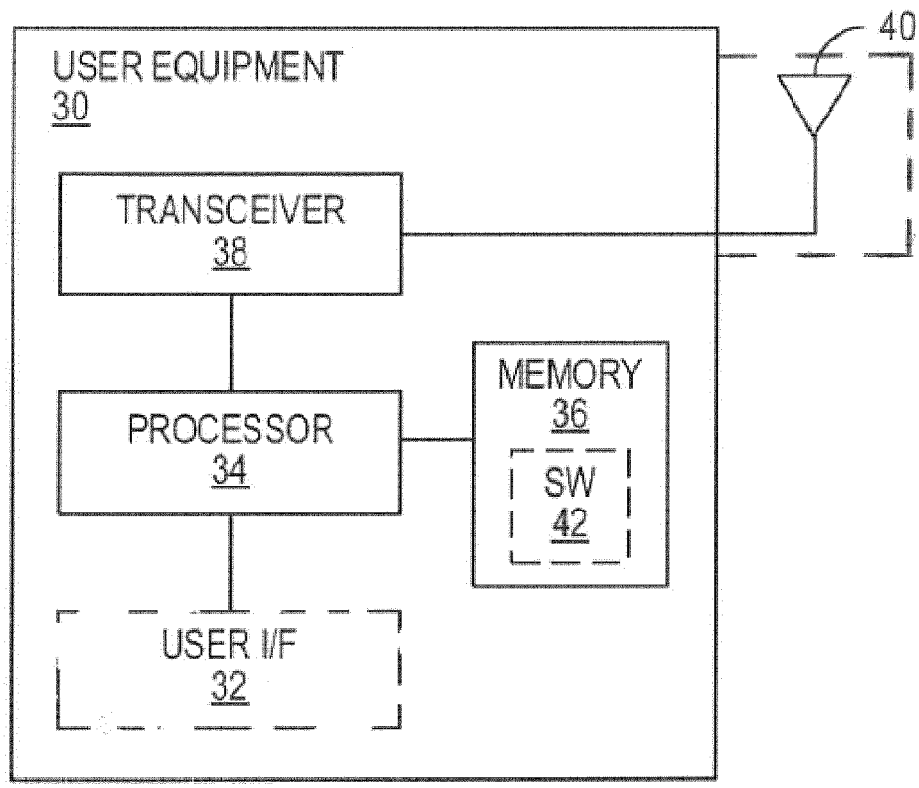
FIG. 18 is a block diagram of a UE.

FIG. 18 depicts a UE 30 operative in embodiments of the present invention. The UE 30 typically includes a user interface 32 (display, touchscreen, keyboard or keypad, microphone, speaker, and the like); in some embodiments, such as in many M2M, MTC or NB-IoT scenarios, the wireless communication device 30 may include only a minimal, or no, user interface 32 (as indicated by the dashed lines of block 32 in FIG. 18). The UE 30 also includes processing circuitry 34; memory 36; and radio circuits, such a transceiver 38, one or more antennas 40, and the like, to effect wireless communication across an air interface to one or more radio network nodes 10. As indicated by the dashed lines, the antenna(s) 40 may protrude externally from the wireless communication device 30, or the antenna(s) 40 may be internal.

According to embodiments of the present invention, the memory 36 is operative to store, and the processing circuitry 34 operative to execute, software 42 which when executed is operative to cause the UE 30 to separately transmit to the network node 10 CA capabilities relating to the UE RF operation and CA capabilities relating to the UE BB operation, and/or RF/BB capabilities decoupled from supported CA band combinations, as described and claimed herein.

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network according to one or more communication protocols known in the art or that may be developed, such as IEEE 802.xx, CDMA, WCDMA, GSM, LTE, UTRAN, WiMax, NB-IoT, or the like. The transceiver 18, 38 implements transmitter and receiver functionality appropriate to the Radio Access Network links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Functional Module Architecture

Figure 19:
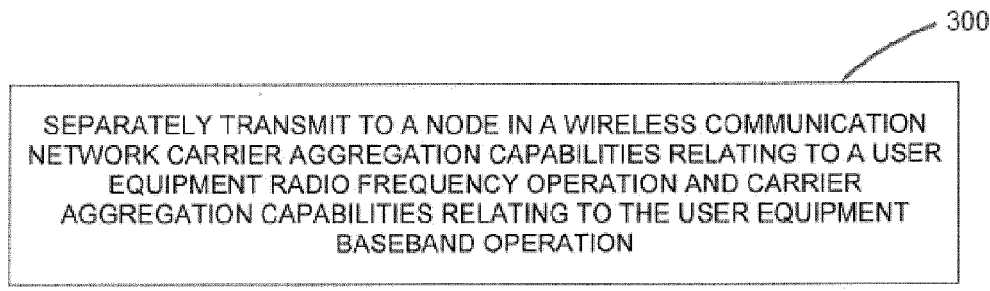
FIG. 19 depicts a functional module operative in a UE.

FIG. 19 depicts a functional module 300, such as may reside in a UE 30, operative to perform the function of separately transmitting to the network node CA capabilities relating to the UE RF operation and CA capabilities relating to the UE BB operation. The RF capabilities comprise at least the number of supported frequency bands and number of MIMO layers supported by the UE 30. The BB capabilities comprise at least an indication of the aggregated bandwidth supported and an indication of the CSI process complexity supported by the UE 30.

Figure 20:
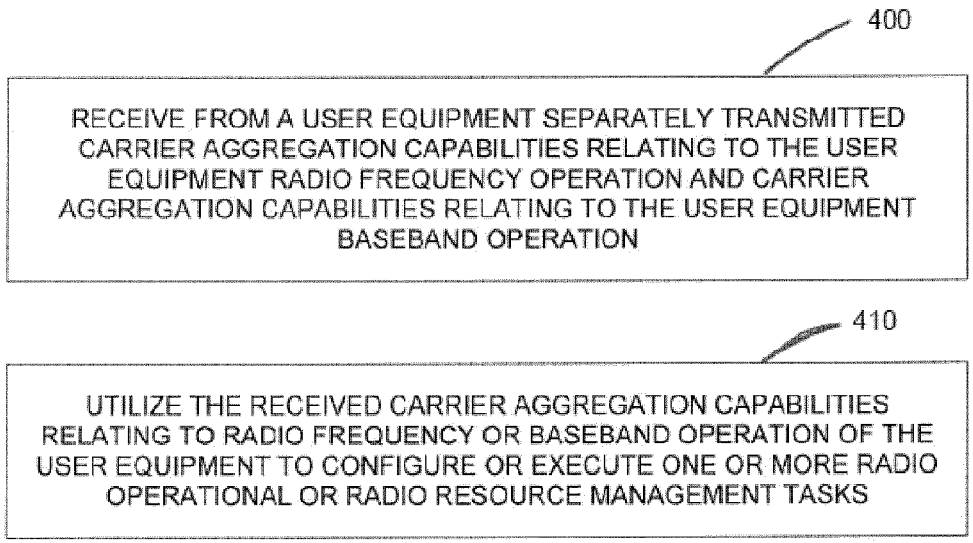
FIG. 20 depicts functional modules operative in a network node.

FIG. 20 depicts functional modules 400, 410, such as may reside in a radio network node 10. Module 400 is operative to receive separately transmitted CA capabilities relating to the UE RF operation and CA capabilities relating to the UE BB operation. The RF capabilities comprise at least the number of supported frequency bands and number of MIMO layers supported by the UE 30. The BB capabilities comprise at least an indication of the aggregated bandwidth supported and an indication of the CSI process complexity supported by the UE 30. Module 410 is operative to utilize the received CA capabilities relating to RF or BB operation of a UE 30 to configure or execute one or more radio operational or radio resource management tasks. Such tasks may include configuring CA cells, coordinating cells, transmitting the UE CA capability information to other network nodes, or the like.

Advantages

Embodiments of the present invention present numerous advantages over legacy CA signaling of the prior art. Primarily, the volume of signaling necessary to convey the required CA capability information is dramatically reduced for the aggregation of more than eight component carriers. This reduction in CA capability transmission payload is achieved by disassociating MIMO/CSI/NAIC capability from band combination signaling, and also by reducing or eliminating explicit fallback capability signaling. The signaling model is extensible, and may easily accommodate new UE capabilities which are either RF or BB dependent. The measurement gap signaling optimization will reduce the gap capability signaling size, further reducing the total UE capability size. The explicit request for inter-RAT capabilities will further reduce the UE capability transmission size.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of communicating carrier aggregation (CA) capabilities from User Equipment (UE) to a node in a wireless communication network, the method comprising:

separately transmitting, to the node, CA capabilities relating to the UE radio frequency (RF) operation and CA capabilities relating to the UE baseband (BB) operation;
wherein the RF capabilities comprise a number of supported frequency bands and a number of MIMO layers supported; and
wherein the BB capabilities comprise an indication of the aggregated bandwidth supported and an indication of the Channel State Information (CSI) process complexity supported.

2. The method of claim 1, further comprising, prior to the separately transmitting RF and BB capabilities:
transmitting, to the node, an indication that separate RF and BB capability transmission is supported by the UE;
receiving, in response to the indication that separate RF and BB capability transmission is supported, an indication from the node that reception of separate RF and BB capability transmission is supported by the node.

3. The method of claim 1, wherein the RF capabilities comprise information on either the maximum or minimum number of supported MIMO layers for at least one of:
each supported frequency band;
each supported frequency band combination;
each supported frequency band combination set; and
for each supported frequency band, indicated per bandwidthclass.

4. The method of claim 1, wherein the RF capabilities further comprise an indication of supported inter-band combinations comprising a SupportedInterbandCombinations list indicating, for each supported frequency band, properties related to inter-band combinations.

5. The method of claim 1, wherein the RF capabilities further comprise an indication of supported intra-band combinations, including at least one of: a number of sub-blocks supported, an indication of a bandwidthclass in the sub-blocks supported, and supported bandwidth combination sets.

6. The method of claim 5, wherein the supported bandwidth combination sets are indicated by a SupportedIntrabandCombinations list indicating, for each supported frequency band, the supported non-CA carrier bandwidths, the supported intra-band contiguous CA carriers, and the supported intra-band non-contiguous CA carriers.

7. The method of claim 1, wherein the indication of the aggregated bandwidth supported comprises the maximum number of component carriers supported.

8. The method of claim 1, wherein the indication of the aggregated bandwidth supported comprises the aggregated bandwidth, comprising sums of the full bandwidth for each component carrier, supporting each number of MIMO layers supported.

9. The method of claim 1, wherein the indication of the aggregated bandwidth supported comprises the aggregated bandwidth, comprising sums of the full bandwidth for each component carrier, supporting each number of CSI processes supported.

10. The method of claim 1, wherein the BB capabilities transmitted to the node comprise one or more of: the relative complexity of each supported MIMO and bandwidth configuration to a predetermined basic configuration, information on the predetermined basic configuration, and the aggregated relative complexity for the UE.

11. The method of claim 1, wherein the BB capabilities transmitted to the node comprise the relative complexity of each supported number of CSI processes and bandwidth configuration to a predetermined basic configuration.

12. The method of claim 1, wherein the BB capabilities transmitted to the node comprise the relative complexity of each supported number of network assisted interference cancellation processes and bandwidth configuration to a predetermined basic configuration.

13. The method of claim 1:
wherein CA capabilities reported to the node represent the maximum capability supported by the UE;
wherein the UE fully supports any lesser CA capability included in the reported CA capabilities; and
wherein the UE does not explicitly signal fallback capabilities.

14. The method of claim 1, further comprising requesting measurement gaps for inter-frequency or inter-RAT measurements for a list of frequency bands that are requested by the network as part of a network requested band combination procedure.

15. A method, by a node in a wireless communication network, of obtaining carrier aggregation (CA) capabilities from User Equipment (UE), the method comprising:
receiving separately transmitted CA capabilities relating to the UE radio frequency (RF) operation and CA capabilities relating to the UE baseband (BB) operation;
wherein the RF capabilities comprise the number of supported frequency bands and number of MIMO layers supported; and
wherein the BB capabilities comprise an indication of the aggregated bandwidth supported and an indication of the Channel State Information (CSI) process complexity supported; and
utilizing the received CA capabilities relating to RF or BB operation of a UE to configure or execute one or more radio operational or radio resource management tasks.

16. A User Equipment (UE) operative in a wireless communication network comprising a plurality of network nodes, the UE comprising:
one or more antennas;
a transceiver operatively connected to the one or more antennas; and
baseband processing circuitry operatively connected to the transceiver and operative to cause the transceiver to separately transmit, to a network node, carrier aggregation (CA) capabilities relating to the UE radio frequency (RF) operation and CA capabilities relating to the UE baseband (BB) operation;
wherein the RF capabilities comprise the number of supported frequency bands and number of MIMO layers supported; and
wherein the BB capabilities comprise an indication of the aggregated bandwidth supported and an indication of the Channel State Information (CSI) process complexity supported.

17. A node operative in a wireless communication network providing carrier aggregation (CA) service to one or more User Equipment (UE), the node comprising:
one or more antennas;
a transceiver operatively connected to the one or more antennas; and
processing circuitry operatively connected to the transceiver and operative to:
cause the transceiver to receive, from a UE, separately transmitted CA capabilities relating to the UE radio frequency (RF) operation and CA capabilities relating to the UE baseband (BB) operation; and
utilize the received CA capabilities relating to RF or BB operation of the UE to configure or execute one or more radio operational or radio resource management tasks;
wherein the RF capabilities comprise the number of supported frequency bands and number of MIMO layers supported; and
wherein the BB capabilities comprise an indication of the aggregated bandwidth supported and an indication of the Channel State Information (CSI) process complexity supported.

* * * * *